US012671101B2

(12) United States Patent (10) Patent No.: US 12,671,101 B2

Haltiner, Jr. et al. (45) Date of Patent: Jun. 30, 2026

(54) FUEL CELL RE-OXIDATION PREVENTION DURING OPERATION STOP

(71) Applicant: GE VERNOVA INFRASTRUCTURE TECHNOLOGY LLC, Greenville, SC (US)

(72) Inventors: Karl J. Haltiner, Jr., Fairport, NY (US); Qiang Liu, Columbus, IN (US); Malcolm James Grieve, Pittsford, NY (US); Andrew Philip Shapiro, Schenectady, NY (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 474 days.

(21) Appl. No.: 18/346,443

(22) Filed: Aug. 11, 2023

(65) Prior Publication Data

US 2024/0039021 A1 Feb. 1, 2024

(51) Int. Cl.
H01M 8/0432 (2016.01)
H01M 8/04746 (2016.01)
H01M 8/1011 (2016.01)

(52) U.S. Cl.
CPC ... H01M 8/04343 (2013.01); H01M 8/04753 (2013.01); H01M 8/1011 (2013.01)

(58) Field of Classification Search
CPC ................................................ H01M 8/04343
See application file for complete search history.

(56) References Cited

U.S. PATENT DOCUMENTS

| | | | |
|---|---|---|---|
| 10,096,840 B1 | 10/2018 | Venkataraman et al. | |
| 2001/0002043 A1* | 5/2001 | Naka ....................... | C01B 3/323 252/373 |
| 2008/0121525 A1 | 5/2008 | Doland | |
| 2009/0258267 A1 | 10/2009 | Mergler et al. | |
| 2011/0189566 A1 | 8/2011 | Hatada | |
| 2011/0300457 A1 | 12/2011 | Kuehn et al. | |
| 2011/0307109 A1 | 12/2011 | Sri-Jayantha | |
| 2015/0044587 A1 | 2/2015 | Matsuo et al. | |

(Continued)

FOREIGN PATENT DOCUMENTS

| | | |
|---|---|---|
| CN | 101841277 | 9/2010 |
| JP | 2012216372 | 11/2012 |

(Continued)

*Primary Examiner* — Brian R Ohara

(74) *Attorney, Agent, or Firm* — Buckley, Maschoff & Talwalkar LLC

(57) ABSTRACT

A fuel cell system includes a hotbox configured to house a fuel cell stack, the fuel cell stack including a temperature sensor configured to detect temperature inside the fuel cell stack. The system includes a first tank including a first valve and configured to store methanol. The system includes a second tank including a second valve and configured to store water. The system includes a controller communicatively coupled to receive signals from the temperature sensor and control each of the first valve and the second valve. The controller is configured to set a dosing rate of methanol, based on a temperature of the fuel cells stack, to a predefined dosing rate and initiate operating at least one of the first valve and the second valve to deliver a mixture of methanol and water at the predefined dosing rate to prevent re-oxidation of an anode of the fuel cell stack.

20 Claims, 7 Drawing Sheets

(56)          References Cited

U.S. PATENT DOCUMENTS

| | | |
|---|---|---|
| 2015/0064586 A1 | 3/2015 | Matsuo et al. |
| 2021/0119231 A1 | 4/2021 | Nakamuta et al. |
| 2021/0124089 A1 | 4/2021 | Sarwat et al. |

FOREIGN PATENT DOCUMENTS

| | | |
|---|---|---|
| JP | 2015191852 | 11/2015 |
| JP | 2016201355 | 12/2016 |
| JP | 2019173082 | 10/2019 |
| KR | 101035398 | 5/2011 |
| KR | 2018070281 | 6/2018 |
| WO | 2013/034422 | 3/2013 |
| WO | 2020/059741 | 3/2020 |
| WO | 2021/203176 | 10/2021 |

* cited by examiner

200

210 — POWER ELECTRONICS SYSTEM CONTROLLER

202 — FUEL CELL SYSTEM CONTROLLER

204

HOTBOX

216 — WATER TANK

218 — SECOND VALVE

212 — METHANOL TANK

214 — FIRST VALVE

206 — REFORMER

12 — FUEL CELL STACK

220 — TEMPERATURE SENSOR

208 — CATALYST CONVERTER

FUEL CELL RE-OXIDATION PREVENTION DURING OPERATION STOP

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/393,354 filed on Jul. 29, 2022, the entire disclosure of which is hereby expressly incorporated herein by reference.

TECHNICAL FIELD

The present disclosure generally pertains to systems and methods for cooling down a fuel cell system during an operation stop.

BACKGROUND

In response to a loss of fuel supply, such as an emergency loss of fuel supply due to power system controller malfunction, loss of power and so on, the nickel in the anode of the fuel cells may undergo a re-oxidation, by the oxygen in the air diffused from the cathode layer or introduced into the anode chamber to form nickel oxide (NiO) at temperatures above ~300° C. The formation of NiO in the microstructure of the anode results in volumetric expansion of the Ni within the anode layer, which exerts stress on the overall structure of the fuel cell. Moreover, this nickel oxidation may cause delamination or cracking of the electrolyte of the fuel cell.

SUMMARY

Embodiments of the present disclosure are included to meet these and other needs.

In one aspect, described herein, a fuel cell system includes a hot box, a first tank, a second tank, and a controller. The hotbox is configured to house a fuel cell stack. The fuel cell stack includes a temperature sensor configured to detect temperature inside the fuel cell stack. The first tank includes a first valve and is configured to store methanol. The second tank includes a second valve and is configured to store water. The controller is communicatively coupled to receive signals from the temperature sensor and control each of the first valve and the second valve.

The controller is configured to, in response to an operation stop condition being present and the temperature of the fuel cell stack being greater than a predefined first threshold temperature, set a dosing rate of methanol to a predefined first dosing rate. In response to the operation stop condition being present and the temperature of the fuel cell stack being greater than a predefined second threshold temperature, the controller is configured to set the dosing rate of the methanol to a predefined second dosing rate. The predefined second dosing rate includes a proportion of methanol per dose greater than a corresponding proportion of methanol per dose of the predefined first dosing rate, where a remainder of the dose is water.

In some embodiments, the predefined second threshold temperature may be greater than the first predefined threshold temperature. In some embodiments, the predefined first threshold temperature may be within a range greater than or equal to 200° C., and the predefined second threshold temperature may be within a range greater than or equal to 300° C.

In some embodiments, the proportion of methanol of the predefined first dosing rate may be within a range from 0% to 30%, and the proportion of methanol per dose of the predefined second dosing rate may be within a range from 50% to 100%.

In some embodiments, the fuel cell system may further include a carrier gas tank operatively coupled to at least one of the first tank and the second tank. The carrier gas tank may be configured to store a carrier gas. The carrier gas tank may release the carrier gas to assist in delivering the mixture of methanol and water in response to a corresponding one of the first valve and the second valve being open.

In some embodiments, the fuel cell system may further include a reformer operatively coupled to the fuel cell stack. The reformer may be configured to reform methanol-water mix supplied thereto to generate hydrogen (H$_2$) and carbon monoxide (CO) to prevent re-oxidation of the anode of the fuel cell stack. In some embodiments, the fuel cell system may further include a catalytic converter operatively coupled to receive an exhaust gas output by the fuel cell stack and/or gas residing within the hotbox and configured to oxidize at least a portion of the gas stream. In some embodiments, the fuel cell system may further include a fan operatively coupled exterior to the hotbox. The fan may be configured to operate to draw the gas stream through the catalytic converter and out of the hotbox. The fuel cell system may further include a power source configured to power the fan. The power source may be an electrically independent, external power source. The power source may be at least one of a grid and a grid-independent battery.

According to a second aspect, described herein, a method for operating a fuel cell system includes, in response to detecting that an operation stop condition is present in a fuel cell system, detecting, by a controller coupled to receive at least one signal from a corresponding sensor, a temperature of a fuel cell stack of the fuel cell system; in response to the temperature of the fuel cell stack being greater than a predefined first threshold temperature, setting a dosing rate of methanol and water to a predefined first dosing rate; in response to the temperature of the fuel cell stack being greater than a predefined second threshold temperature, setting the dosing rate of methanol and water to a predefined second dosing rate, the predefined second dosing rate including a proportion of methanol greater than a corresponding proportion of methanol in the predefined first dosing rate; and initiating providing a mixture of methanol and water to the fuel cell system at one of the predefined first dosing rate and the predefined second dosing rate to prevent re-oxidation of an anode of the fuel cell stack.

In some embodiments, detecting that the operation stop condition is present may include at least one of detecting a loss of supply of fuel cell fuel and detecting that signal is absent from a power electronics controller.

In some embodiments, the method may further include initiating operating the fuel cell system in a remediation control operating mode in response to detecting that an operation stop condition is present in the fuel cell system. In some embodiments, the method may further include detecting a temperature of the fuel cell stack prior to initiating operating the fuel cell system in the remediation control operating mode. Initiating operating the fuel cell system in the remediation control operating mode may be in response to the temperature of the fuel cell stack being greater than the predefined first threshold temperature.

In some embodiments, at least one of the proportion of methanol of the predefined first dosing rate may be within a range from about 0% to about 30% and the proportion of methanol of the predefined second dosing rate may be within a range from about 50% to about 100%. In some embodiments, a remainder of the dose may be water. The dose may be 100%.

According to a third aspect, described herein, a fuel cell system includes a temperature sensor, a first tank, a second tank, and a controller. The temperature sensor is configured to detect temperature of a fuel cell stack of the fuel cell system. The first tank incudes a first valve and is configured to store methanol. The second tank includes a second valve and is configured to store water. The controller is communicatively coupled to receive signals from the temperature sensor and control each of the first valve and the second valve.

The controller is configured to, in response to an operation stop condition being present and the temperature of the fuel cell stack being greater than a predefined first threshold temperature, set a dosing rate of methanol and water to a predefined first dosing rate. The controller is also configured to, in response to the operation stop condition being present and the temperature of the fuel cell stack being greater than a predefined second threshold temperature, set the dosing rate of methanol and water to a predefined second dosing rate. The predefined second threshold temperature is greater than the predefined first threshold temperature. The predefined second dosing rate includes a proportion of methanol per dose greater than a corresponding proportion of methanol per dose of the predefined first dosing rate. The controller is further configured to initiate operating at least one of the first valve and the second valve to deliver a mixture of methanol and water at one of the predefined first dosing rate and the predefined second dosing rate to prevent-re-oxidation of an anode of the fuel cell stack.

In some embodiments, the first valve and the second valve may be at least one of mechanical, electrical, and electro-mechanical. In some embodiments, at least one of the first tank and the second tank may be gravity-fed. In some embodiments, the fuel cell system may further include a carrier gas tank operatively coupled to at least one of the first tank and the second tank and configured to assist in generating the mixture of methanol and water at one of the predefined first dosing rate and the predefined second dosing rate. In some embodiments, the fuel cell system may further include a hotbox configured to house the fuel cell stack and a fan operatively coupled exterior to the hotbox. The controller may be configured to operate the fan to draw gas within the hotbox through the catalytic converter and out of the hotbox.

BRIEF DESCRIPTION OF DRAWINGS

The detailed description particularly refers to the following figures, in which.

DETAILED DESCRIPTION

Figure 1A:
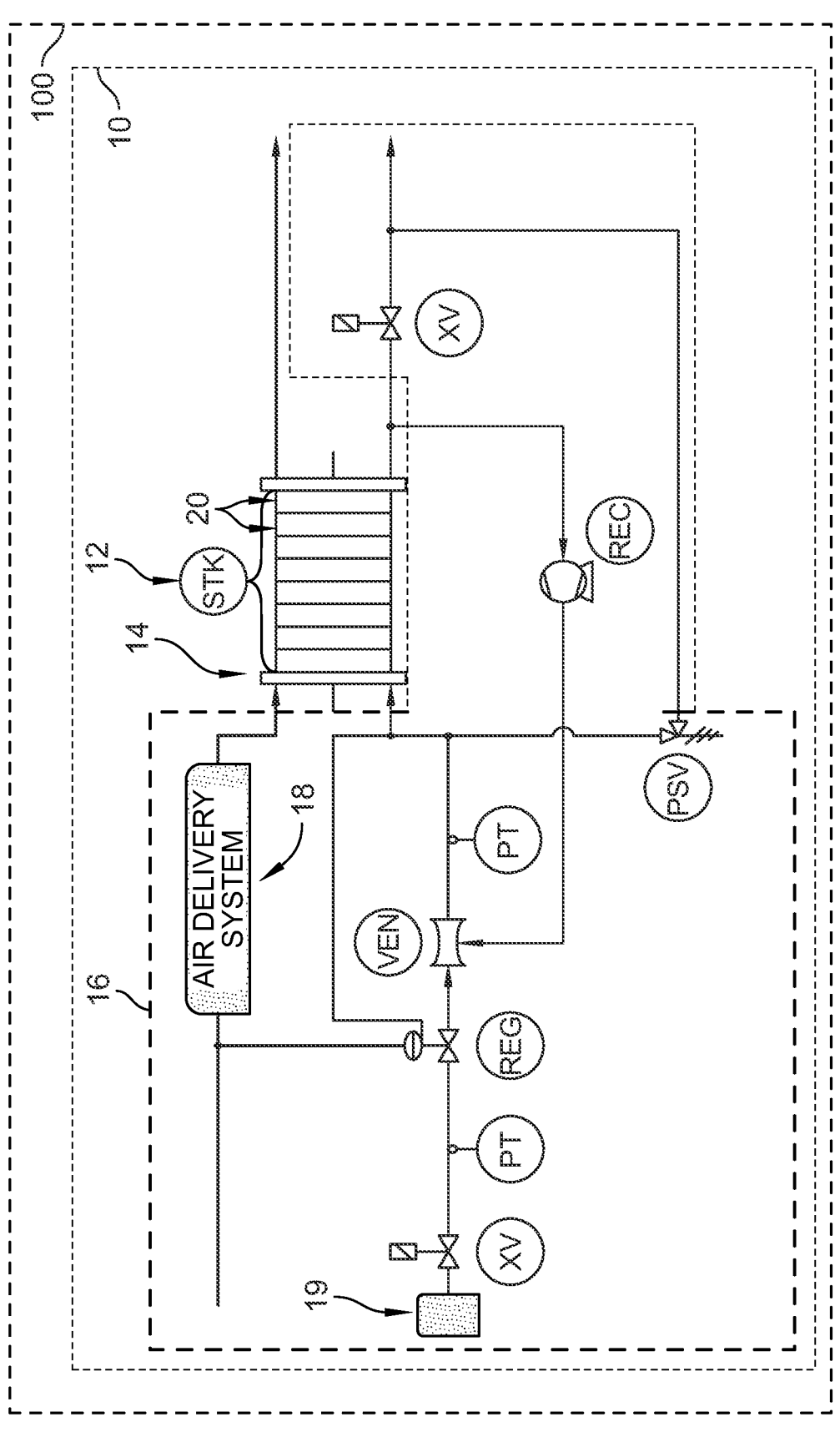
FIG. 1A is a schematic view of an exemplary fuel cell system including an air delivery system, a hydrogen delivery system, and a fuel cell module including a stack of multiple fuel cells.

An example process of the present disclosure provides using a methanol-steam mixture including one or more predefined ratios of methanol and steam, in response to an operation stop, such as an emergency operation stop (e-stop), to protect an anode of a fuel cell stack 12 from re-oxidation during cooling of the fuel cell stack 12 from a predefined present (measured) temperature to a predefined desired temperature (e.g., to room or ambient temperature). Using water and methanol in liquid phase, as described herein, is significantly cheaper and requires less space than, for example, protecting the fuel cell stack 12 from re-oxidation using a supply of a reducing gas 5% $H_2$ (balanced by $N_2$).

A likelihood of formation of nickel tetracarbonyl $Ni(CO)_4$ within the fuel cell stack 12 and/or a hotbox 204 may be minimal when temperature of the fuel cell stack 12, at a time of operation stop occurrence, is equal to or greater than a predefined threshold temperature, such as, for example, 300° C. However, even though a possibility of formation of nickel tetracarbonyl is minimal, a continuous reduction of atmosphere to inhibit nickel re-oxidation may still be necessary in the fuel cell stack 12 having a temperature of 300° C. or more. Accordingly, the dosing may be adjusted to increase the ratio of methanol in feedstock to provide a continuous reduction of atmosphere to inhibit nickel re-oxidation. In just one example, in response to operating temperature of the fuel cell stack 12 during loss of fuel being equal to or greater than 300° C., dosing of methanol in feedstock may be at a first predefined ratio greater than a second predefined ratio of methanol in feedstock when temperature of the fuel cell stack 12 is less than 300° C.

In one example, when the temperature of the fuel cell stack 12, at a time of fuel loss, is equal to or greater than 500° C., a ratio of methanol in feedstock may be adjusted to be 100%. In another example, when the temperature of the fuel cell stack 12, at a time when a loss of fuel occurs, is equal to or greater than 300° C., dosing may be such that a ratio of methanol in feedstock is greater than a ratio of methanol when the temperature of the fuel cell stack 12 is less than 300° C.

When temperature of the fuel cell stack 12 (as measured in response to detecting a fuel supply loss) is within a range from about 200° C. to about 300° C., the risk of nickel tetracarbonyl formation becomes greater, with its generation rate as a function of temperature, pressure and carbon monoxide concentration. Each of the conditions of temperature (T), pressure (P), and carbon monoxide (CO) percent % may need to comport with a predefined time weighted requirement (e.g., 1 part per billion (ppb)) at a same time, i.e., T<240° C.+P=1 atm+CO %>10 mol %. In an example, in response to the temperature of the fuel cell stack 12 being between 200-300° C., methanol dosing rate may be reduced or decreased (as low as 0%) such that amount of carbon monoxide generated is below a predefined threshold, e.g., <10% CO generated.

As another example, when the temperature of the fuel cell stack 12 (as measured in response to detecting a fuel supply loss) is less than 200° C., a likelihood of Ni(CO)$_4$ formation may be high, while a possibility of Ni re-oxidation may approach zero. Accordingly, providing either methanol or water may be stopped, when the temperature of the fuel cell stack 12 (as measured in response to detecting a fuel supply loss) is below 200° C., such that the system 10, 200, 300, 400, 500 cools down to a predefined room, or ambient, temperature unassisted by a methanol-water mixture dosing.

In other examples, dosing of methanol may be stopped and dosing of water may be continued until temperature of the fuel cell stack 12 decreases from about 200° C. to about 50° C. Dosing of water may be stopped when the temperature of the fuel cell stack 12 is less than or equal to 50° C. While example temperature ranges described as being greater than 500° C., greater than 300° C., from about 300° C. to about 200° C., less than 200° C., and less than 50° C., applications of the systems and methods described herein are not limited thereto. Of course, different dosing ratios may be applied to different temperature ranges may be applied according to a change in a likelihood of Ni(CO)$_4$ formation and/or a likelihood of Ni re-oxidation.

Figures 1B, 1C:
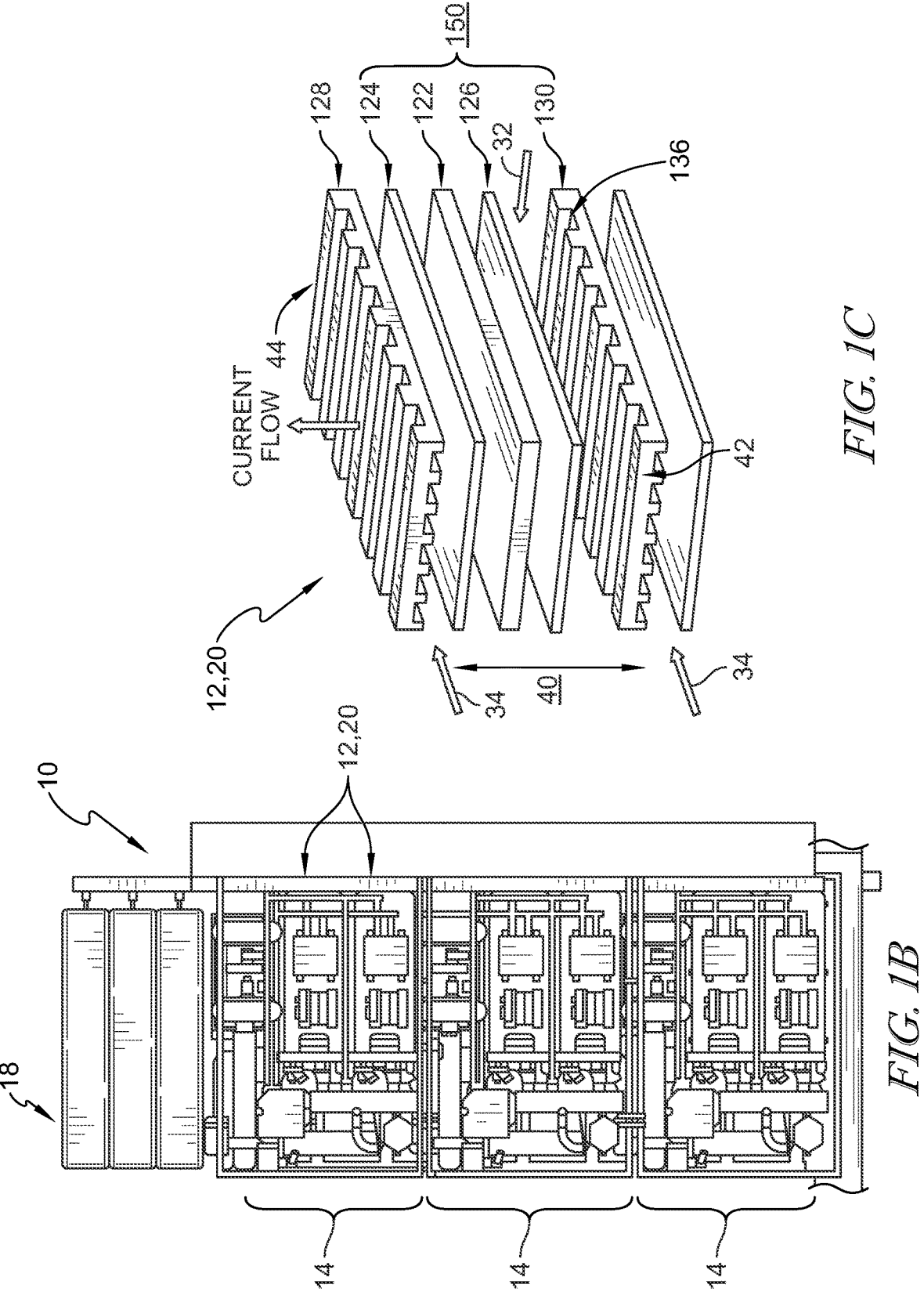
FIG. 1B is a cutaway view of an exemplary fuel cell system including an air delivery system, hydrogen delivery systems, and a plurality of fuel cell modules each including multiple fuel cell stacks.
FIG. 1C is a perspective view of an exemplary repeating unit of a fuel cell stack of the fuel cell system of FIG. 1A.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 122 and a gas diffusion layers (GDL) 124, 126 on either or both sides of the membrane electrode assembly (MEA) 122 (see FIG. 1C). The fuel cell 20 further includes a bipolar plate (BPP) 128, 130 on the external side of each gas diffusion layers (GDL) 124, 126, as shown in FIG. 1C. The above-mentioned components, in particular the bipolar plate 130, the gas diffusion layer (GDL) 126, the membrane electrode assembly (MEA) 122, and the gas diffusion layer (GDL) 124 comprise a single repeating unit 150.

The bipolar plates (BPP) 128, 130 are responsible for the transport of reactants, such as fuel 32 (e.g., hydrogen) or oxidant 34 (e.g., oxygen, air), and cooling fluid 136 (e.g., coolant and/or water) in a fuel cell 20. The bipolar plates (BPP) 128, 130 can uniformly distribute reactants 32, 34 to an active area 40 of each fuel cell 20 through oxidant flow fields 42 and/or fuel flow fields 44 formed on outer surfaces of the bipolar plates (BPP) 128, 130. The active area 40, where the electrochemical reactions occur to generate electrical power produced by the fuel cell 20, is centered, when viewing the stack 12 from a top-down perspective, within the membrane electrode assembly (MEA) 122, the gas diffusion layers (GDL) 124, 126, and the bipolar plate (BPP) 128, 130.

The bipolar plates (BPP) 128, 130 may each be formed to have reactant flow fields 42, 44 formed on opposing outer surfaces of the bipolar plate (BPP) 128, 130, and formed to have coolant flow fields located within the bipolar plate (BPP) 128, 130. For example, the bipolar plate (BPP) 128, 130 can include fuel flow fields 44 for transfer of fuel 32 on one side of the plate 128, 130 for interaction with the gas diffusion layer (GDL) 126, and oxidant flow fields 42 for transfer of oxidant 34 on the second, opposite side of the plate 128, 130 for interaction with the gas diffusion layer (GDL) 124. The bipolar plates (BPP) 128, 130 can further include coolant flow fields formed within the plate (BPP) 128, 130, generally centrally between the opposing outer surfaces of the plate (BPP) 128, 130. The coolant flow fields facilitate the flow of cooling fluid 136 through the bipolar plate (BPP) 128, 130 in order to regulate the temperature of the plate (BPP) 128, 130 materials and the reactants. The bipolar plates (BPP) 128, 130 are compressed against adjacent gas diffusion layers (GDL) 124, 126 to isolate and/or seal one or more reactants 32, 34 within their respective pathways 44, 42 to maintain electrical conductivity, which is required for robust operation of the fuel cell 20 (see FIG. 1C).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Figure 2:
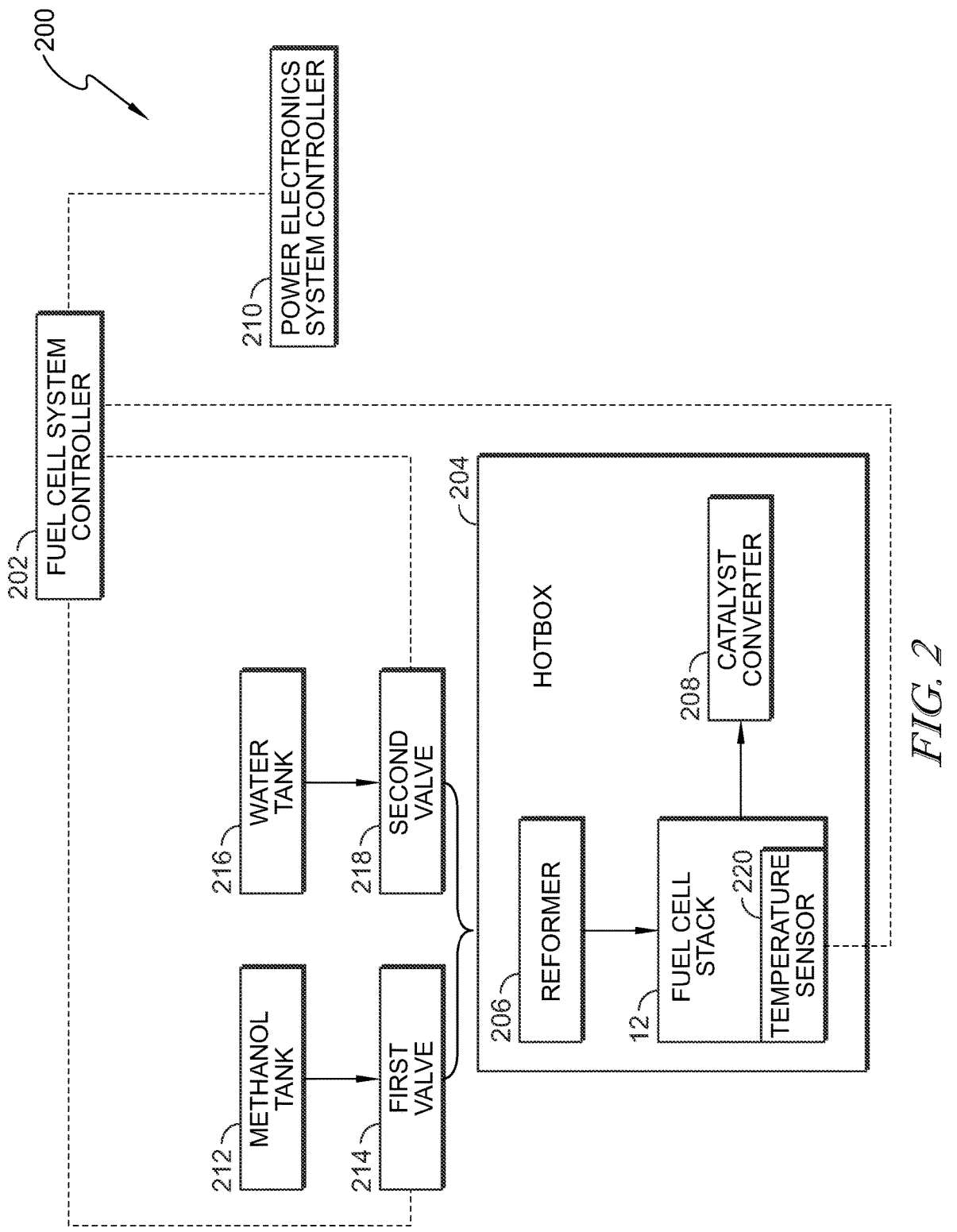
FIG. 2 is a block diagram illustrating an example stop control system.

FIG. 2 illustrates an example system 200 for controlling operation stop of the fuel cell stack 12. A fuel cell system controller 202 is configured to monitor and control operation of one or more components of the fuel cell system 200. Maintaining stable temperatures during operation of high temperature components of the fuel cell system 200 is critical for the thermal efficiency and the electrical efficiency of the SOFC fuel cell system 200. The system 200 may include the fuel cell system 10 of FIGS. 1A-1C. A hotbox 204 of the fuel cell system 200 may include one or more of such high temperature components, such as, but not limited to, the fuel cell stack 12, a reformer 206, and a catalyst converter 208. The reformer 206 may be configured to combine fuel and/or air and/or steam to generate reformed fuel that is then supplied to the fuel cell stack 12. While not separately illustrated, the fuel cell system 200 may include a pre-heater configured to heat the reformed fuel before the fuel is delivered to the fuel cell stack 12. The catalyst converter 208 may be configured to receive exhaust output by the fuel cell stack 12 and oxidize carbon monoxide and other harmful or undesirable components present therein.

In response to one or more operating conditions, signals, or commands, the fuel cell system controller 202 is configured to initiate operating the fuel cell system 200 in a remediation control operating mode. An example of conditions, signals, or commands triggering initiation of operation of the fuel cell system 200 in the remediation control operating mode includes, but is not limited to, conditions, signals, or commands that indicate occurrence of an operation stop and/or an emergency operation stop. In one example, the fuel cell system controller 202 is configured to detect an operation stop and/or an emergency operation stop condition in response to failing to receive one or more predefined signals from the power electronics controller 210. As another example, the fuel cell system controller 202 is configured to detect an operation stop and/or an emergency operation stop condition in response to detecting a loss of fuel cell fuel supply. Other examples of received signals or failure to receive signals, in response to which the fuel cell system controller 202 identifies an operation stop and/or an emergency operation stop are also contemplated.

In an example, operating the fuel cell system 200 in a remediation control operating mode includes providing a predefined amount of methanol and water (including, but not limited to, water vapor, steam, condensate, and other states of the substance that has undergone a partial or complete phase change) into the reformer 206 within the hotbox 204.

The methanol may be stored in a methanol tank 212 coupled to the hotbox 204 via a first valve 214. The fuel cell system controller 202 is configured to open the first valve 214 to permit flow of methanol from the methanol tank 212 into the reformer 206 within the hotbox 204 and close the first valve 214 to stop and/or prevent flow of methanol from the methanol tank 212 into the reformer 206 within the hotbox 204. Water may be stored in a water tank 216 coupled to the hotbox 204 via a second valve 218. The fuel cell system controller 202 is configured to open the second valve 218 to permit flow of water from the water tank 216 into the reformer 206 within the hotbox 204 and close the second valve 218 to stop and/or prevent flow of water from the water tank 216 into the reformer 206 within the hotbox 204.

Each of the first valve 214 and the second valve 218 may be electrical, mechanical, electromechanical, or some combination thereof. In one example, the fuel cell system controller 202 is configured to monitor and control operation of the first valve 214 and the second valve 218. Further, it is contemplated that the methanol output by the methanol tank 212 and/or water output by the water tank 216 may be gravity fed in response to each of the corresponding valves 214, 218 being open, such that a predefined desired dosing rate may be generated prior to the mixture entering the reformer 206 within the hotbox 204.

In an example, the fuel cell system controller 202 is configured to operate to open and close each of the first valve 214 and the second valve 218 such that a methanol-water mixture entering the reformer 206 within the hotbox 204 has a predefined proportion or ratio of each of methanol and water. The fuel cell system controller 202 may determine the proportion or ratio of each of methanol and water based on temperature of the fuel cell stack 12 when the fuel cell system controller 202 detects an operation stop and/or an emergency operation stop condition.

Figure 3:
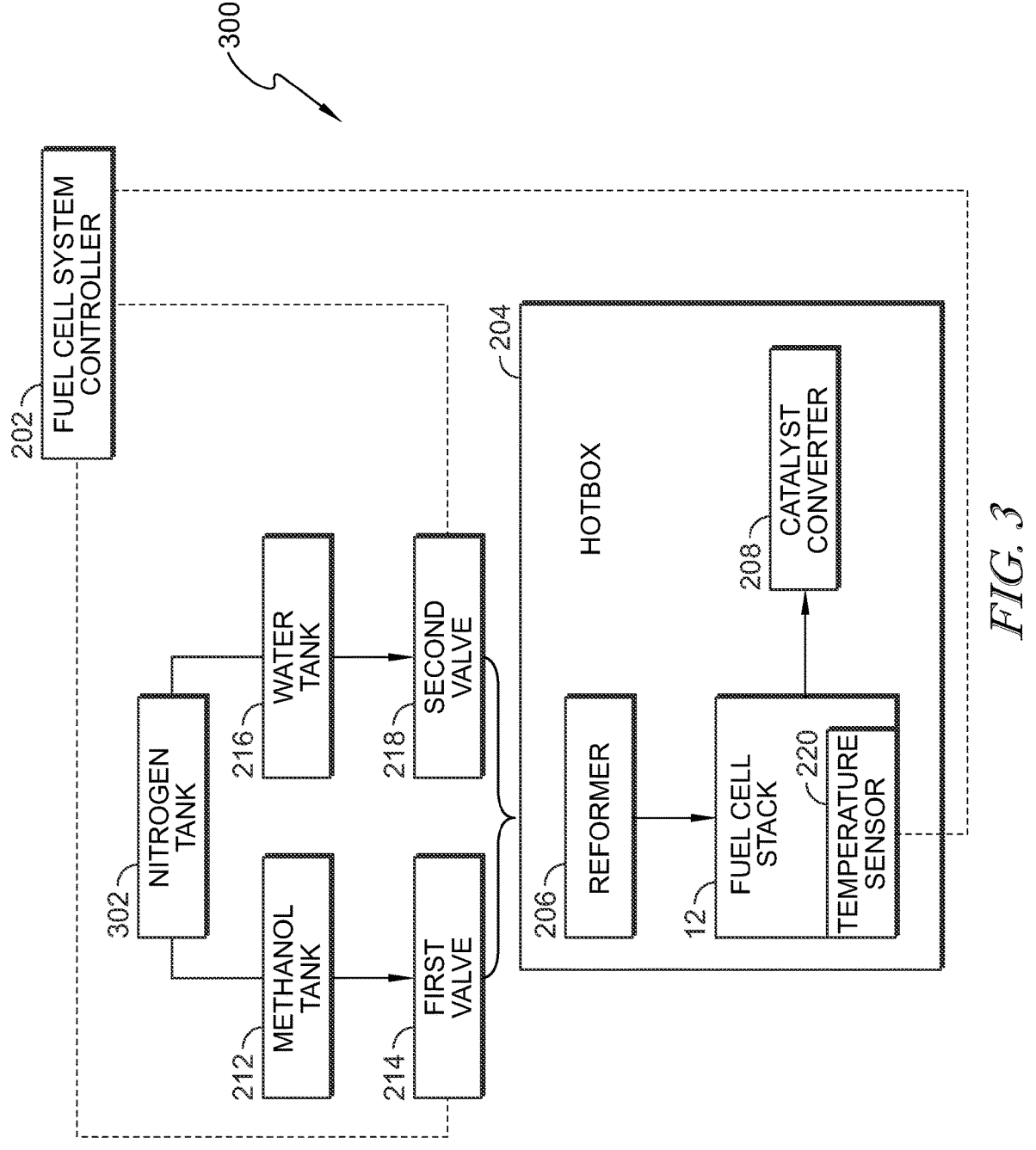
FIG. 3 is a block diagram illustrating another example implementation of the stop control system.

FIG. 3 illustrates an example system 300 for controlling operation stop of the fuel cell stack 12 in accordance with the present disclosure. The system 300 may include the fuel cell system 10 of FIGS. 1A-1C. The system 300 includes a nitrogen tank 302 coupled to each of the methanol tank 212 and the water tank 216. The nitrogen tank 302 may be configured to store nitrogen or another carrier gas, such as, but not limited to, helium, nitrogen, hydrogen, and argon. In response to the first valve 214 and/or the second valve 218 being open, such as during a remediation control operating mode, the nitrogen from the nitrogen tank 302 may serve as a carrier gas for the methanol and water to assist with generating predefined dosing of methanol and water, as described, for example, in reference to FIG. 6.

Figure 4:
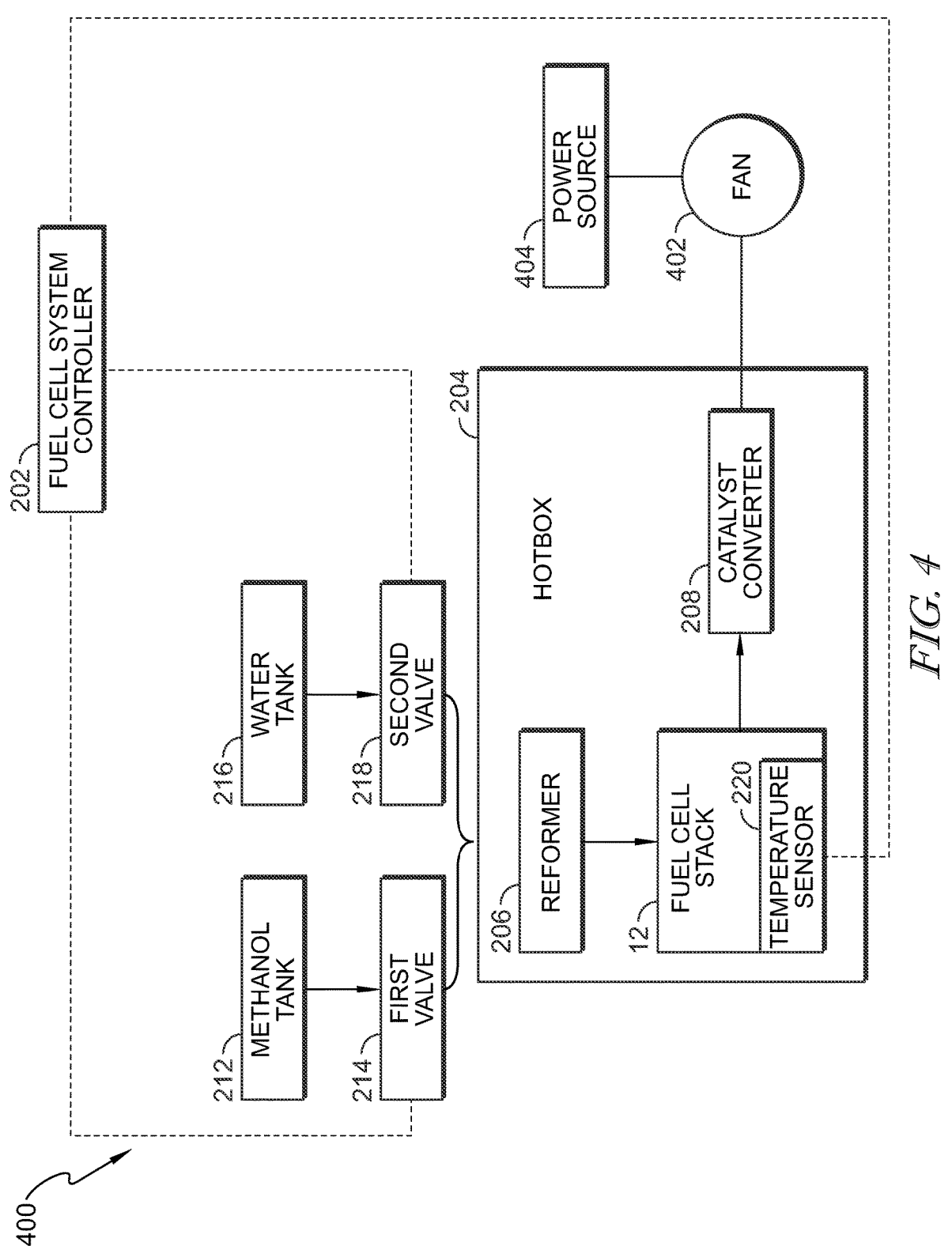
FIG. 4 is a block diagram illustrating still another example implementation of the stop control system.

FIG. 4 illustrates an example system 400 for controlling operation stop of the fuel cell stack 12 in accordance with the present disclosure. The system 400 may include the fuel cell system 10 of FIGS. 1A-1C. The system 400 includes a fan 402 coupled exterior to the hotbox 204 and configured to receive or draw out output of the catalyst converter 208. The fuel cell system controller 202 may be configured to monitor and control operation of the fan 402. In one example, the fuel cell system controller 202 is configured to turn on, or otherwise activate, and turn off, or otherwise deactivate or prevent activation of, the fan 402 in response to one or more operating conditions being present in the fuel cell system 400. The catalyst converter 208 is used to convert hydrogen ($H_2$) or carbon monoxide (CO) present in the gas stream to water ($H_2O$) and carbon dioxide ($CO_2$), respectively. The system 400 further includes a power source 404 configured to power the fan 402. The power source 404 may be an electrically independent, external power source. For example, the power source 404 may be at least one of a grid and a grid-independent battery.

As just one example, the fuel cell system controller 202 may turn on, or otherwise activate, the fan 402 in response to detecting that an operation stop and/or an emergency operation stop condition is present and/or in response to initiating operating the fuel cell stack 12 in a remediation control operating mode and/or in response to at least one of the first valve 214 and the second valve 218 being open. As another example, the fuel cell system controller 202 may turn off, or otherwise deactivate and/or prevent activation of, the fan 402 in response to detecting that an operation stop and/or an emergency operation stop condition is not present and/or in response to stopping operating the fuel cell stack 12 in a remediation control operating mode and/or in response to at least one of the first valve 214 and the second valve 218 being closed.

Figure 5:
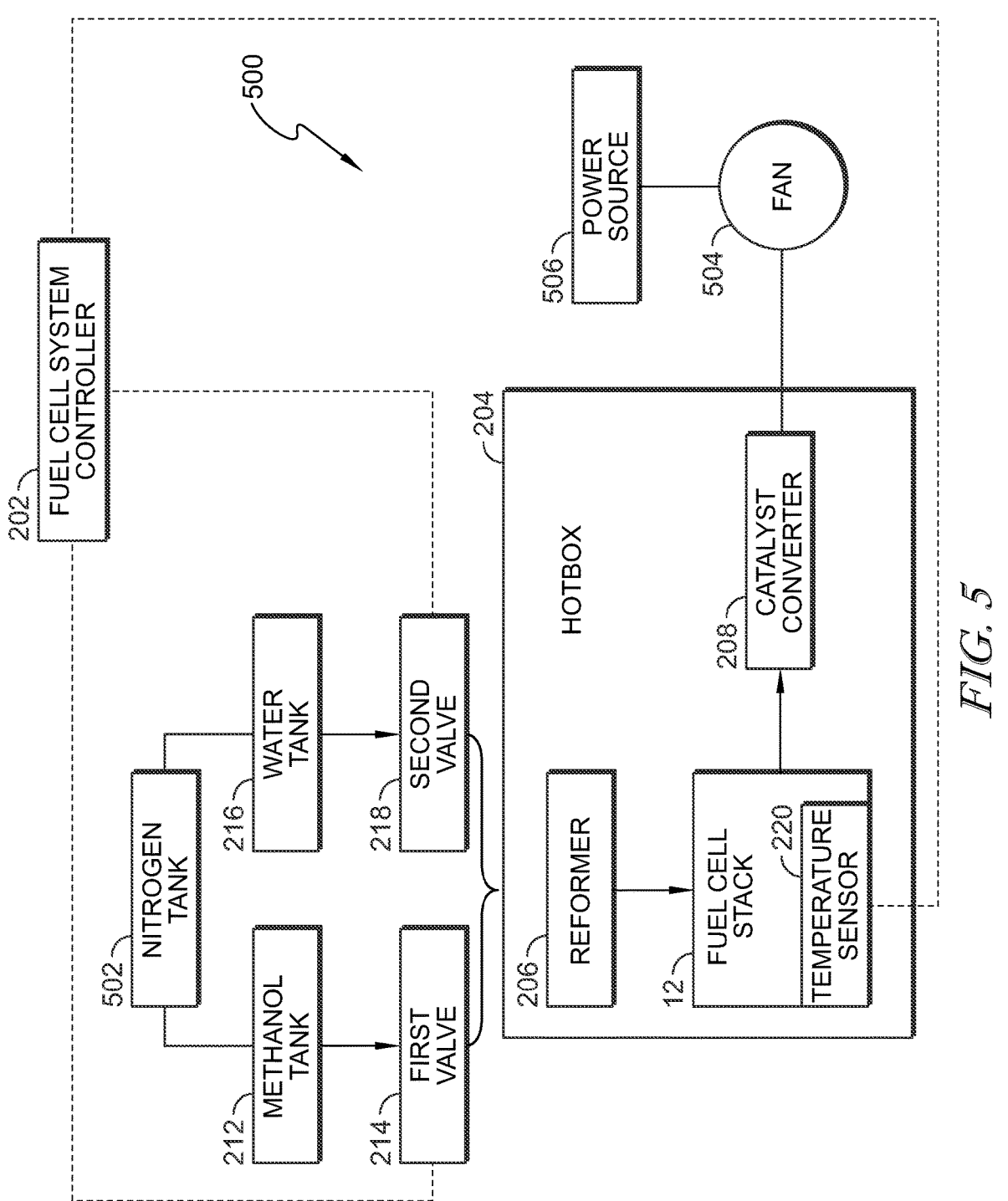
FIG. 5 is a block diagram illustrating yet another example implementation of the stop control system.

FIG. 5 illustrates an example system 500 for controlling operation stop of the fuel cell stack 12 in accordance with the present disclosure. The system 500 may include the fuel cell system 10 of FIGS. 1A-1C. The system 500 includes a nitrogen tank 502 configured to house nitrogen or another carrier gas and a fan 504 coupled exterior to the hotbox 204 and configured to receive or draw out output of the catalyst converter 208. In an example, in response to the first valve 214 and/or the second valve 218 being open, such as during a remediation control operating mode, the nitrogen from the nitrogen tank 502 may serve as a carrier gas for the methanol and water to assist with generating predefined dosing of methanol and water, as described, for example, in reference to FIG. 6. The fuel cell system controller 202 may be configured to turn on, or otherwise activate, and turn off, or otherwise deactivate or prevent activation of, the fan 504 in response to one or more operating conditions being present in the fuel cell system 500, such in response to at least one of the valves 214, 218 being open or closed. The fan 504 can be configured to pull gasses from the fuel cell system 500 and/or from the hot zone enclosure to pull gasses leaked from the system 500 into the hot zone enclosure. The controller can be separate from the main controller and dedicated just to operation stop control.

The system 500 further includes a power source 506 configured to power the fan 504. The power source 506 may be an electrically independent, external power source. For example, the power source 506 may be at least one of a grid and/or a grid-independent battery.

Figure 6:
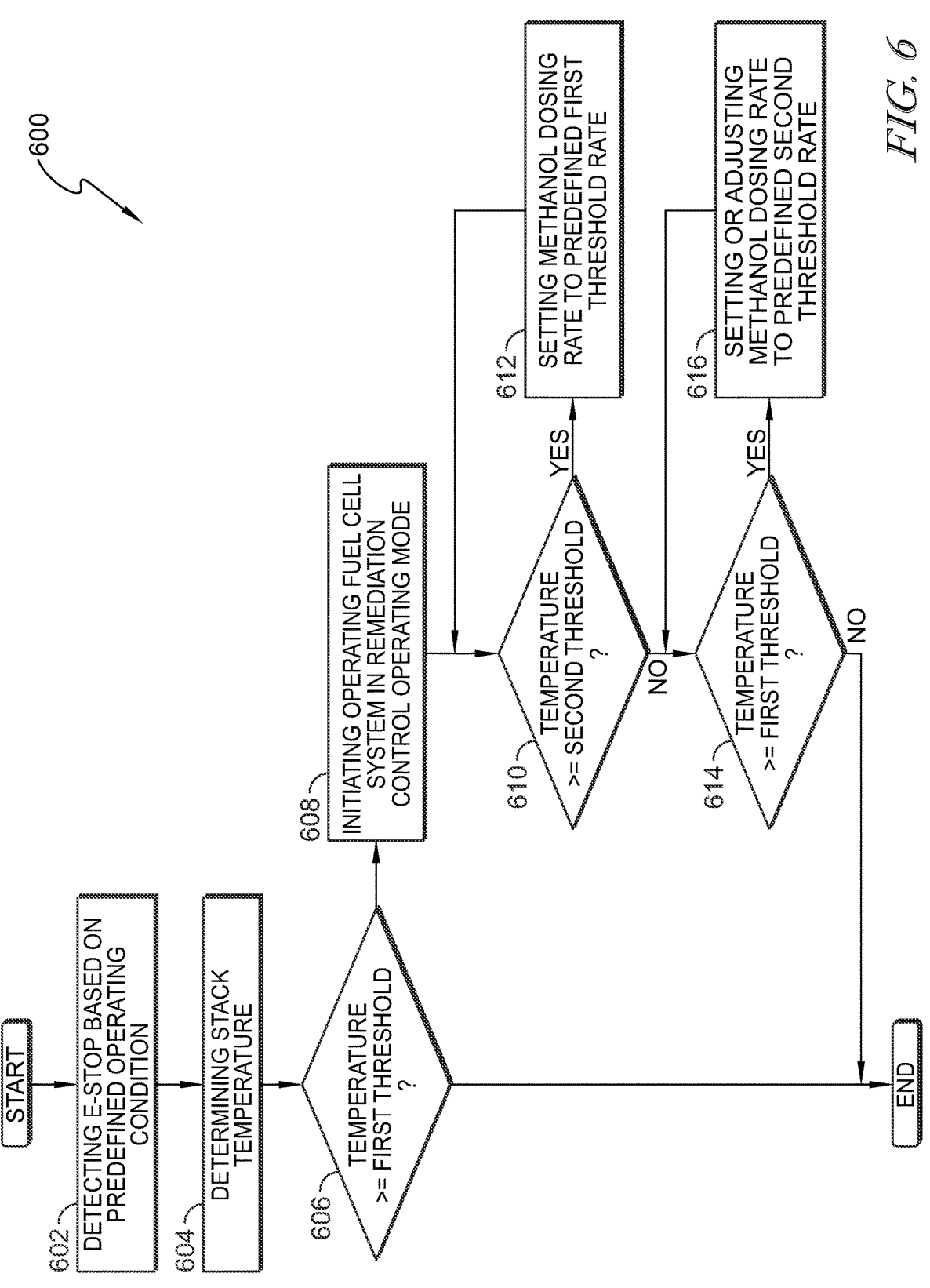
FIG. 6 is a block diagram illustrating an exemplary process flow for controlling stop of the fuel cell stack of FIG. 1A.

FIG. 6 illustrates an example process 600 for controlling operation stop of the fuel cell stack 12 in response to loss of signal from the power electronics controller 210. One or more operations of the process 600 may be executed by the fuel cell system controller 202 as described in reference to FIGS. 2-5. The process 600 may begin at block 602, where the fuel cell system controller 202 detects an operation stop and/or an emergency operation stop condition. As just some examples, the fuel cell system controller 202 detects an operation stop and/or an emergency operation stop condition in response to failing to receive one or more predefined signals from the power electronics controller 210 and/or detecting a loss of fuel cell fuel supply. One or more operations of the process 600 may be executed by a dedicated operation stop controller, or by fully mechanical means utilizing valves that open/close when de-energized and/or are thermostatically energized.

At block 604, the fuel cell system controller 202 determines temperature of the fuel cell stack 12. In one example, the fuel cell system controller 202 receives one or more signals from a corresponding temperature sensor 220 disposed within the fuel cell stack 12 indicating a present temperature of the fuel cell stack 12. In other examples, the fuel cell system controller 202 receives a signal, automatically or in response to a corresponding request, from one or more controllers, sensors, or other devices of the system 200.

The fuel cell system controller 202, at block 606, determines whether temperature of the fuel cell stack 12 is greater than or equal to a predefined first threshold temperature. In one example, the predefined first threshold temperature may be about 200° C. Other values of the predefined first threshold temperature, e.g., either greater than or less than 200° C., such as, but not limited to, 199° C., 198° C., 197° C., 201° C., 202° C., 203° C., and so on, are also contemplated. As just one example, the predefined first threshold temperature may be about 50° C. The fuel cell system controller 202 may exit process 600 in response to temperature of the fuel cell stack 12 being less than the predefined first threshold, such as, but not limited to, less than 200° C.

In response to determining that temperature of the fuel cell stack 12 is greater than or equal to the predefined first threshold temperature, the fuel cell system controller 202, at block 608, initiates operating the fuel cell system 200 in a remediation control operating mode. In an example, initiating operating the fuel cell system 200 in a remediation control operating mode includes determining a predefined proportion or ratio of each of methanol and water in a methanol-water mixture to be supplied into the reformer 206 within the hotbox 204. Additionally or alternatively, initiating operating the fuel cell system 200 in a remediation control operating mode includes determining open and/or close times (operating duty cycle) of each of the first valve 214 and the second valve 218 to generate in a methanol-water mixture having a predefined proportion or ratio of each of methanol and water.

The fuel cell system controller 202, at block 610, determines whether temperature of the fuel cell stack 12 is greater than or equal to a predefined second threshold. In one example, the predefined second threshold temperature is greater than the predefined first threshold temperature. In an example, the predefined second threshold temperature may be about 300° C. Other values of the predefined second threshold temperature, e.g., either greater than or less than 300° C., are also contemplated.

In response to temperature of the fuel cell stack 12 being greater than or equal to the predefined second threshold temperature, such as, but not limited to, being greater than or equal to 300° C., the fuel cell system controller 202, at block 612, sets a dosing rate of methanol to a predefined first threshold rate. The predefined first threshold rate may range from about 50% to about 100% methanol per dose with a remainder of the dose, i.e., within a range of about 50% to about 0%, respectively, being water. As described in reference to FIGS. 2-5, the fuel cell system controller 202 may set the dosing rate, proportion, or ratio of methanol and water to the predefined first threshold rate, proportion, or ratio by controlling corresponding duty cycles of each of the first valve 214 and the second valve 218. In some instances, the process 600 may then return to block 610 where the fuel cell system controller 202 determines whether the temperature of the fuel cell stack 12 is greater than or equal to the predefined second threshold temperature. In this manner, the fuel cell system controller 202 maintains a dosing rate of methanol and water at the predefined first threshold rate set at block 612 until temperature of the fuel cell stack 12 becomes sufficiently low, i.e., less than the predefined second threshold temperature, at which point the process 600 may proceed to block 614.

In response to determining at block 610 that temperature of the fuel cell stack 12 is less than the predefined second threshold temperature, such as, but not limited to, being less than 300° C., the fuel cell system controller 202, at block 614, determines whether temperature of the fuel cell stack 12 is greater than or equal to a predefined first threshold temperature, e.g., about 200° C. In response to detecting at block 614 that temperature of the fuel cell stack 12 is less than the predefined first threshold temperature, the fuel cell system controller 202 may be configured to stop operating the fuel cell system 200 in a remediation control operating mode and may exit the process 600.

In response to detecting at block 614 that temperature of the fuel cell stack 12 is greater than or equal to the predefined first threshold temperature, such as, but not limited to, being greater than or equal to 200° C., the fuel cell system controller 202, at block 616, sets a dosing rate of methanol to a predefined second threshold rate. The predefined second threshold rate may range from about 0% to about 30% methanol per dose with a remainder of the dose being water, i.e., within a range from about 100% to about 70%, respectively. As described in reference to FIGS. 2-5. 5, the fuel cell system controller 202 may set the dosing rate, proportion, or ratio of methanol and water to the predefined second threshold rate, proportion, or ratio by controlling corresponding duty cycles, i.e., a duration of time each the valves 214, 218 are open and closed, of each of the first valve 214 and the second valve 218.

In some instances, the process 600 may then return to block 614 where the fuel cell system controller 202 determines whether the temperature of the fuel cell stack 12 is greater than or equal to the predefined first threshold temperature. In this manner, the fuel cell system controller 202 maintains a dosing rate of methanol and water at the predefined second threshold rate set at block 616 until temperature of the fuel cell stack 12 becomes sufficiently low, i.e., less than the predefined first threshold temperature, at which point the process 600 may end.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A fuel cell system comprising:
   a hotbox configured to house a fuel cell stack, the fuel cell stack including a temperature sensor configured to detect temperature inside the fuel cell stack;
   a first tank including a first valve and configured to store methanol;
   a second tank including a second valve and configured to store water; and a controller communicatively coupled to receive signals from the temperature sensor and control each of the first valve and the second valve, the controller being configured to:
   in response to an operation stop condition being present and the temperature of the fuel cell stack being greater than a predefined first threshold temperature, set a dosing rate of methanol to a predefined first dosing rate,
   in response to the operation stop condition being present and the temperature of the fuel cell stack being greater than a predefined second threshold temperature, set the dosing rate of methanol to a predefined second dosing rate, the predefined second dosing rate including a proportion of methanol per dose greater than a corresponding proportion of methanol per dose of the predefined first dosing rate, a remainder of the dose being water, and
   initiate operating at least one of the first valve and the second valve to deliver a mixture of methanol and water at one of the predefined first dosing rate and the predefined second dosing rate to prevent re-oxidation of an anode of the fuel cell stack.

2. The fuel cell system of claim 1, wherein the predefined second threshold temperature is greater than the predefined first threshold temperature.

3. The fuel cell system of claim 2, wherein the predefined first threshold temperature is within a range greater than or equal to 200° C., and wherein the predefined second threshold temperature is within a range greater than or equal to 300° C.

4. The fuel cell system of claim 1, wherein the proportion of methanol of the predefined first dosing rate is within a range from 0% to 30%, and wherein the proportion of methanol per dose of the predefined second dosing rate is within a range from 50% to 100%.

5. The fuel cell system of claim 1 further comprising a carrier gas tank operatively coupled to at least one of the first tank and the second tank and configured to store a carrier gas, wherein the carrier gas tank releases the carrier gas to assist in delivering the mixture of methanol and water in response to a corresponding one of the first valve and the second valve being open.

6. The fuel cell system of claim 1 further comprising a reformer operatively coupled to the fuel cell stack and configured to reform methanol-water mix supplied thereto to generate hydrogen ($H_2$) and carbon monoxide (CO) to prevent re-oxidation of the anode of the fuel cell stack.

7. The fuel cell system of claim 6 further comprising a catalytic converter operatively coupled to receive an exhaust gas output by the fuel cell stack and/or gas residing within the hotbox and configured to oxidize at least a portion of the gas stream.

8. The fuel cell system of claim 7 further comprising a fan operatively coupled exterior to the hotbox and configured to operate to draw the gas stream through the catalytic converter and out of the hotbox, and a power source configured to power the fan, wherein the power source is an electrically independent, external power source, and wherein the power source is at least one of the a grid and a grid-independent battery.

9. The fuel cell system of claim 1 further comprising an energy source configured to power at least one of the first valve, the second valve, and the controller, wherein the energy source is electrically independent from a corresponding energy source that powers a fuel cell system including the fuel cell stack, and wherein the electrically independent energy source includes at least one of the a grid and a grid-independent battery.

10. A method for operating a fuel cell system, the method comprising:

in response to detecting that an operation stop condition is present in a fuel cell system, detecting, by a controller coupled to receive at least one signal from a corresponding sensor, a temperature of a fuel cell stack of the fuel cell system;

in response to the temperature of the fuel cell stack being greater than a predefined first threshold temperature, setting a dosing rate of methanol and water to a predefined first dosing rate;

in response to the temperature of the fuel cell stack being greater than a predefined second threshold temperature, setting the dosing rate of methanol and water to a predefined second dosing rate, the predefined second dosing rate including a proportion of methanol greater than a corresponding proportion of methanol in the predefined first dosing rate; and initiating providing a mixture of methanol and water to the fuel cell system at one of the predefined first dosing rate and the predefined second dosing rate to prevent re-oxidation of an anode of the fuel cell stack.

11. The method of claim 10, wherein detecting that the operation stop condition is present includes at least one of detecting a loss of supply of fuel cell fuel and detecting that signal is absent from a power electronics controller.

12. The method of claim 10, further comprising initiating operating the fuel cell system in a remediation control operating mode in response to detecting that an operation stop condition is present in the fuel cell system.

13. The method of claim 12, further comprising detecting a temperature of the fuel cell stack prior to initiating operating the fuel cell system in the remediation control operating mode, wherein initiating operating the fuel cell system in the remediation control operating mode is in response to the temperature of the fuel cell stack being greater than the predefined first threshold temperature.

14. The method of claim 10, wherein at least one of the proportion of methanol of the predefined first dosing rate is within a range from about 0% to about 30% and the proportion of methanol of the predefined second dosing rate is within a range from about 50% to about 100%.

15. The method of claim 14, wherein a remainder of the dose is water, and wherein the dose is 100%.

16. A fuel cell system comprising:

a temperature sensor configured to detect temperature of a fuel cell stack of the fuel cell system;

a first tank including a first valve and configured to store methanol;

a second tank including a second valve and configured to store water; and a controller communicatively coupled to receive signals from the temperature sensor and control each of the first valve and the second valve, the controller being configured to:

in response to an operation stop condition being present and the temperature of the fuel cell stack being greater than a predefined first threshold temperature, set a dosing rate of methanol and water to a predefined first dosing rate;

in response to the operation stop condition being present and the temperature of the fuel cell stack being greater than a predefined second threshold temperature, set the dosing rate of methanol and water to a predefined second dosing rate, the predefined second threshold temperature being greater than the predefined first threshold temperature, and the predefined second dosing rate including a proportion of methanol per dose greater than a corresponding proportion of methanol per dose of the predefined first dosing rate; and initiate operating at least one of the first valve and the second valve to deliver a mixture of methanol and water at one of the predefined first dosing rate and the predefined second dosing rate to prevent-re-oxidation of an anode of the fuel cell stack.

17. The fuel cell system of claim 16, wherein the first valve and the second valve are at least one of mechanical, electrical, and electromechanical.

18. The fuel cell system of claim 17, wherein at least one of the first tank and the second tank is gravity-fed.

19. The fuel cell system of claim 17 further comprising a carrier gas tank operatively coupled to at least one of the first tank and the second tank and configured to assist in generating the mixture of methanol and water at one of the predefined first dosing rate and the predefined second dosing rate.

20. The fuel cell system of claim 17 further comprising a hotbox configured to house the fuel cell stack and a fan operatively coupled exterior to the hotbox, wherein the controller is configured to operate the fan to draw gas within the hotbox through the catalytic converter and out of the hotbox.

* * * * *